United States Patent [19]
Wiener

[11] 4,062,218
[45] Dec. 13, 1977

[54] CUTTING OR PRESSING APPLIANCES
[75] Inventor: Hans Wiener, Taby, Sweden
[73] Assignee: Pressmaster AB, Stockholm, Sweden
[21] Appl. No.: 732,596
[22] Filed: Oct. 15, 1976
[30] Foreign Application Priority Data
Oct. 15, 1975 United Kingdom ............... 42308/75
[51] Int. Cl.$^2$ ............................................. B21D 37/12
[52] U.S. Cl. ........................................ 72/409; 81/314; 81/319
[58] Field of Search ..................... 72/409, 410; 29/748, 29/750, 758, 811, 818; 81/313, 314, 319, 322, 323, 342, 348, 351, 364, 381, 383, 423, 427

[56] References Cited
U.S. PATENT DOCUMENTS

| 881,619 | 3/1908 | Robidoux | 72/409 |
| 2,505,564 | 4/1950 | Meyer | 81/319 |
| 3,181,341 | 5/1965 | Thornton et al. | 72/410 |
| 3,732,719 | 5/1973 | Palotta | 72/410 |

FOREIGN PATENT DOCUMENTS
735,642   6/1966   Canada .................................. 81/314

Primary Examiner—Michael J. Keenan
Attorney, Agent, or Firm—Karl F. Ross

[57] ABSTRACT

An appliance for cutting or otherwise deforming rod-shaped workpieces, e.g. wires, has an elongate tool body with an intermediate portion to which an actuating member or handle is pivotally connected at a first fulcrum. An extremity of the tool body, extending beyond that first fulcrum, carries a first jaw and terminates in a tip to which an arm carrying a coacting second jaw is articulated at a second fulcrum. The opposite end of the arm is rigid with or hinged to an arcuate rack, centered on the second fulcrum, whose teeth are engageable by a stepping pawl on the handle to drive the jaws closer together when the handle is swung in a predetermined sense relative to the tool body.

11 Claims, 3 Drawing Figures

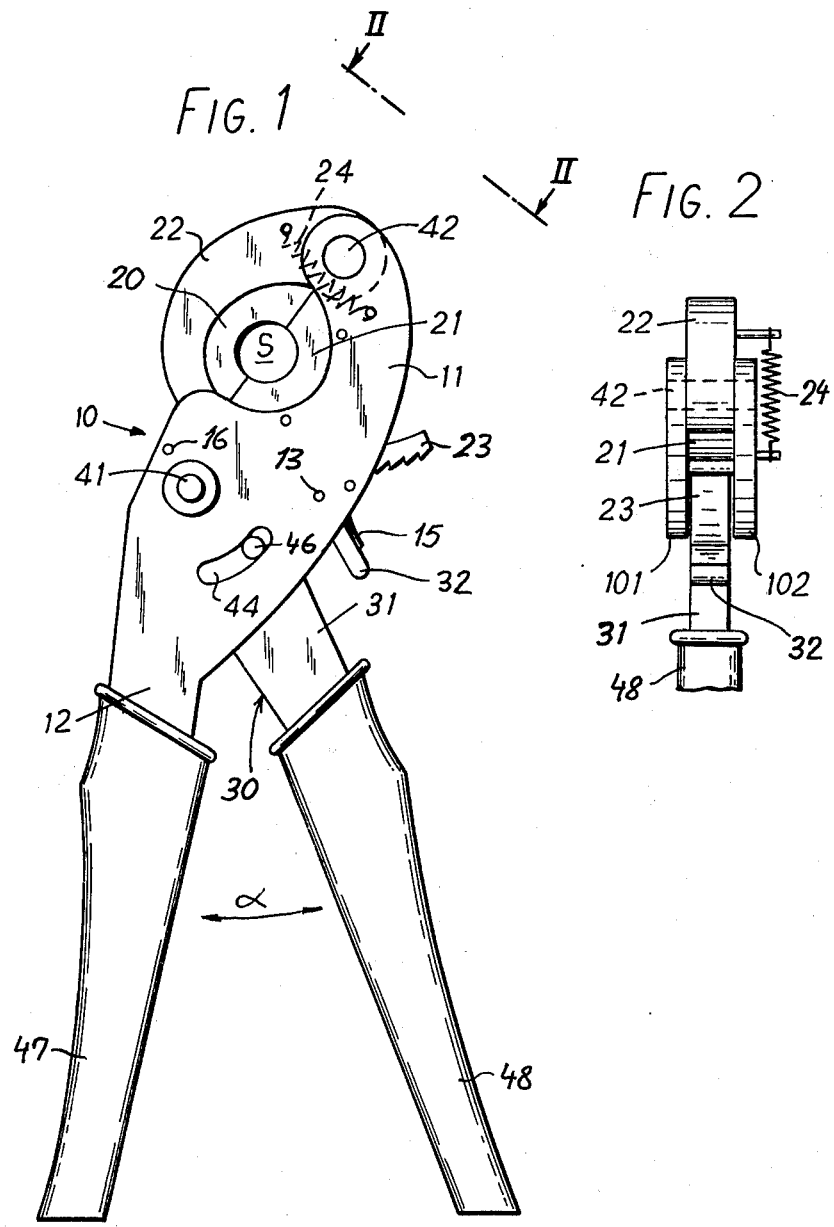

CUTTING OR PRESSING APPLIANCES

FIELD OF THE INVENTION

My present invention relates to an appliance to be used for gripping and cutting or otherwise deforming generally rod-shaped workpieces such as wires or cables, either manually or with the aid of some source of power.

BACKGROUND OF THE INVENTION

Appliances of this description normally have a pair of jaws, with or without cutting edges, mounted to approach each other with an arcuate motion, as in a pair of pliers, or along a rectilinear path, as in a vise. Depending on whether the workpiece is to be severed or merely crimped or indented, the jaws are laterally offset from each other or aligned in a common plane of motion.

With substantially rectilinear displacement, e.g. in a tool of the type described in my copending application Ser. No. 647,641 filed Jan. 8, 1976, the workpiece can be gripped from all sides even in an early phase of the deforming operation. With conventional plier-type appliances, however, the jaws are separated at least initially by a gap on the side of the workpiece opposite their pivot. As pressure is applied, the gap progressively narrows but the exerted stress has a tendency to deflect the jaws in opposite directions from their plane or planes of rotation. Heavy wires, for example, can be cut only by rather massive jaws regardless of the available force.

OBJECTS OF THE INVENTION

The object of my present invention, therefore, is to provide a manual or automatic appliance of the character last referred to which can deform heavier workpieces than has been possible with conventional tools of comparable weight and size.

SUMMARY OF THE INVENTION

An improved appliance according to my invention comprises an elongate body with an extremity carrying a first jaw, an arm articulated to a tip of that extremity carrying a second jaw, and an actuating member or handle articulated to a portion of the tool body adjoining the jaw-carrying extremity, the actuating member and the arm being swingable about parallel pivotal axes relatively to the tool body. A force-transmitting mechanism links the actuating member with a part of the arm separated by the second jaw from the tip of the body extremity to which it is articulated, this mechanism translating a swing of the actuating member in a predetermined direction into a movement of the jaws toward each other whereby clamping pressure is exerted upon a workpiece inserted into the space between the jaws.

The tool body and the actuating member may have shanks of approximately the same length, as measured from their pivotal axis, enabling the exertion of clamping pressure upon the workpiece by manually squeezing these shanks together. In a power-operated appliance, on the other hand, the tool body may be a stationary part fixed, for example, to the cylinder of a hydraulic or pneumatic jack whose piston is connected with the actuating member.

According to an advantageous embodiment, the force-transmitting mechanism comprises a rack member secured to the jaw-carrying arm and a pawl on the actuating member engageable with this rack for intermittently advancing the jaws toward each other, in discrete steps, upon relative oscillations of the actuating member and the tool body in a pumping action. This construction enables a gradual incrementation of the exerted clamping pressure until the desired degree of deformation of the workpiece, with or without severance, is achieved.

BRIEF DESCRIPTION OF THE DRAWING

The above and other features of my invention will now be described in detail with reference to the accompanying drawing in which:

FIG. 1 is a side view of an appliance embodying my invention;

FIG. 2 is a fragmentary end view as seen on the line II—II of FIG. 1; and

SPECIFIC DESCRIPTION

Figure 3:
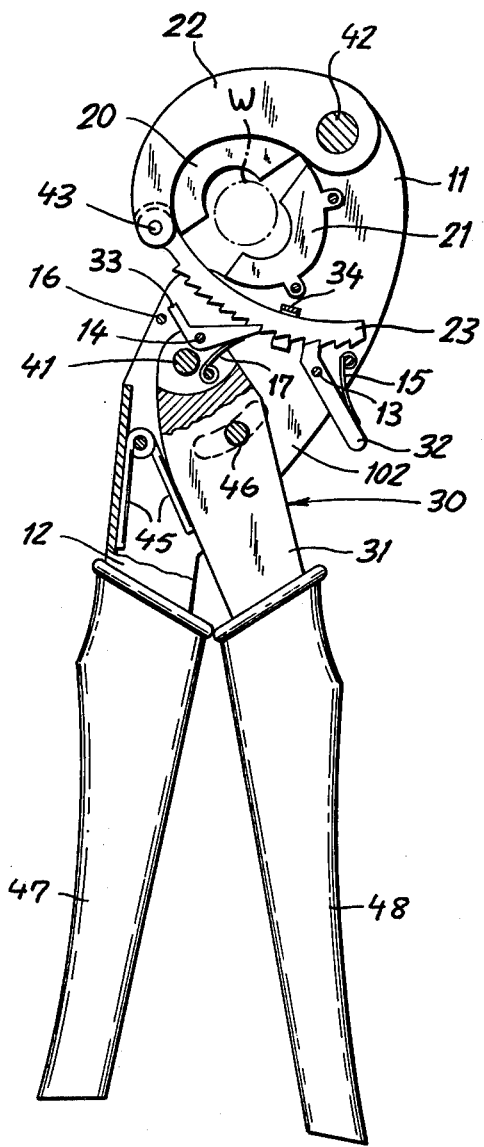
FIG. 3 is a view, similar to FIG. 1 but with parts broken away, showing the appliance in an alternate position.

The appliance shown in the drawing is a manual tool adapted to be used for such purposes as cutting a wire, crimping a rod or stripping part of the insulation from an electric cable. The tool has an elongate body 10 with an upper extremity 11 and a downwardly extending shank 12, the latter being clad in insulation 47. An actuating member or handle 30 forms a generally similar shank 31, clad in insulation 48, and is articulated to body 10 by a pivot pin 41 at an intermediate portion between extremity 11 and shank 12. Extremity 11 carries a jaw 21 with a curved edge confronting a similar jaw 20 with an oppositely curved edge on an arm 22 which is articulated to the tip of that extremity by a pivot pin 42. A tension spring 24, anchored to extremity 11 and arm 22, tends to draw the jaws 20 and 21 together into an illustrated closure position in which a residual work space S remains therebetween.

Spring 24 may be duplicated on opposite sides of the tool body 10, though this has not been illustrated.

The end of arm 22 remote from pivot 42 is not connected with tool body 10 but is linked with handle 30 by a force-transmitting mechanism comprising an arcuate rack 23 and a co-operating stepping pawl 33. Rack 23 is hinged to the free end of arm 22 by a pin 43 which is parallel to pivot pins 41 and 42, i.e. perpendicular to the major sides of body 10 and handle 30. Stepping pawl 33, received in a recess of member 30, is pivoted on that member by a pin 14 for engagement with the toothed convex edge of rack 23 which confronts the fulcrum 41; a retaining pawl 32 is pivoted on body 10 by another pin 13 and is also engageable with the rack teeth toward which it is urged by a leaf spring 15. A similar spring 17, FIG. 3, biases the pawl 33 into engagement with these teeth unless the actuating member or handle 30 is swung counterclockwise far enough to let pawl 33 come into contact with a pin 16 fixed to body 10 whereby that pawl is retracted from the rack. By raising the projecting tail of pawl 32, the user may then completely release the rack 23 so that jaws 20 and 21 can be reopened to unclamp a workpiece W gripped by them.

In order to prevent any upward escape of the rack from the pawls 32 and 33, a guide yoke 34 bracketing the rack engages it from its concave side. Body 10, as seen in FIG. 2, has two parallel, axially spaced cheeks 101, 102 flanking the arm 22, the rack 23 and the yoke 34. It will be evident that the yoke 34 could be omitted if the rack were rigid with arm 22 rather than hinged to it as shown.

The relative swing of members 12 and 30 is limited by coacting formations including a transverse stud 46 on the handle and aligned arcuate slots 44, centered on pivot pin 41, on cheeks 101, 102. Naturally, the arrangement could also be inverted by having a slot in the handle traversed by a pin spanning the two cheeks. The clearance between these cheeks accommodating the members 23 and 31 is closed at the left-hand edge of body 10, as seen in FIG. 3, by a solid wall integral with body cheeks against which a leg of a hairpin spring 45 comes to rest, the other leg of that spring bearing upon member 30 in a sense tending to increase the angle $\alpha$ included between the two shanks. Thus, by squeezing the two shanks 12, 31 together against the force of spring 45, as shown in FIG. 3, the user may advance the rack 23 toward the right by one or two teeth at a time, thereby progressively restricting the work space S and correspondingly squeezing or cutting into the workpiece W. If that workpiece is a heavily insulated cable with a conductive core of a diameter equaling that of the space S in the closure position of FIG. 1, the jaws 20, 21 can be used to strip the insulation clean from part of that cable. The tool body 10 of generally U-shaped cross-section, with its parallel cheeks 101, 102, could be formed from a bent strip of sheet metal.

The retaining pawl 32 could be omitted in the case of inelastic workpieces, not exerting any restoring force upon the rack 23, or if that restoring force is insufficient to overcome the force of spring or springs 24. With pawl 32 absent (or very close to pawl 33), and with rack 33 hinged to arm 22 as shown, the rack need not be curved about fulcrum 42, and could even be straight, as long as the pawl 33 engages its teeth in the immediate vicinity of yoke 34.

Jaws 20 and 21 may be removably seated in their respective carriers 22, 11 for replacement by a different pair, e.g. one with straight cutting edges causing the work space S to disappear completely in the closure position of FIG. 1. Pairs of jaws with relatively staggered sets of parallel blades, e.g. as disclosed in my copending application Ser. No. 647,641, could also be used. In each instance I prefer to place the two fulcra 41, 42 substantially in line with the center of the work space S (or with the contacting jaw edges) in the position of closure.

The rack-and-pawl mechanism 23, 33 allows even heavy workpieces to be deeply indented or completely cut through by a pumping action, i.e. a succession of short strokes each requiring but little force. This mechanism can also be replaced by other unidirectionally effective couplings, e.g. those employing wedges or friction rollers as used in conventional overrunning clutches or freewheels. The force acting on shanks 12 and 31 could be other than manual, e.g. that of a solenoid or a fluidic servomotor.

I claim:

1. An appliance for gripping and deforming generally rod-shaped workpieces, comprising:
    an elongate tool body with an extremity carrying a first jaw;
    an actuating member articulated to said tool body, at a portion of said tool body adjoining said extremity, for relative swinging about a first pivotal axis;
    an arm articulated to a tip of said extremity for relative swinging about a second pivotal axis parallel to said first pivotal axis, said arm carrying a second jaw confronting said first jaw and bracketing therewith a work space located between said pivotal axes; and
    force-transmitting means linking said actuating member with a part of said arm separated from said tip by said second jaw for translating a swing of said actuating member in a predetermined direction with reference to said tool body into a movement of said jaws toward each other with exertion of clamping pressure upon a workpiece inserted into said work space, said force-transmitting means including a rack member secured to said part and a stepping pawl on said actuating member directly coacting with said rack member for intermittently advancing said jaws toward each other upon relative oscillations of said actuating member and said tool body, said working space being surrounded on all sides by said extremity, said arm and said rack member.

2. An appliance as defined in claim 1 wherein said rack member is curved about said second pivotal axis.

3. An appliance as defined in claim 3 wherein said rack member has a toothed convex edge confronting said first pivotal axis.

4. An appliance as defined in claim 1, further comprising a retaining pawl on said tool body engageable with said rack member for maintaining an exerted clamping pressure.

5. An appliance as defined in claim 1 wherein said tool body and said actuating member are provided with interengaging formations limiting the stroke of said relative oscillations.

6. An appliance as defined in claim 1, further comprising resilient means on said tool body biasing said actuating member against said predetermined direction.

7. An appliance as defined in claim 1 wherein said rack member is secured to said arm by a hinge joint, said tool body being provided provided with guide means bracketing said rack member for preventing an excursion thereof about said hinge joint.

8. An appliance as defined in claim 7 wherein said tool body comprises a pair of axially spaced cheeks flanking said rack member and said arm, said guide means being a yoke disposed between said cheeks.

9. An appliance as defined in claim 1, further comprising spring means anchored to said tool body and to said arm for drawing said jaws toward each other.

10. An appliance as defined in claim 1 wherein said first and second jaws are removably seated on said extremity and on said arm.

11. An appliance as defined in claim 1 wherein said actuating member and said tool body have shanks extending for substantially the same distance from said first pivotal axis, said jaws moving closer together upon a swinging of said shanks toward each other.

* * * * *